United States Patent
Eddy et al.

(10) Patent No.: US 12,090,413 B1
(45) Date of Patent: Sep. 17, 2024

(54) AMUSEMENT DEVICE WITH AN INTERACTIVE TARGET AND PROJECTOR FEATURE

(71) Applicant: STERN PINBALL, INC., Elk Grove Village, IL (US)

(72) Inventors: Brian Eddy, Elk Grove Village, IL (US); Elliot Eismin, Elk Grove Village, IL (US)

(73) Assignee: Stern Pinball, Inc., Elk Grove Village, IL (US)

( * ) Notice: Subject to any disclaimer, the term of this patent is extended or adjusted under 35 U.S.C. 154(b) by 593 days.

(21) Appl. No.: 17/358,888

(22) Filed: Jun. 25, 2021

Related U.S. Application Data

(60) Provisional application No. 63/044,170, filed on Jun. 25, 2020.

(51) Int. Cl.
  *A63F 7/02* (2006.01)
  *A63F 7/30* (2006.01)
  *G03B 21/10* (2006.01)

(52) U.S. Cl.
  CPC ............. *A63F 7/027* (2013.01); *A63F 7/30* (2013.01); *G03B 21/10* (2013.01)

(58) Field of Classification Search
  CPC .. A63F 7/025; A63F 7/027; A63F 7/30; A63F 7/36; G03B 21/10
  See application file for complete search history.

(56) References Cited

U.S. PATENT DOCUMENTS

| | | | | |
|---|---|---|---|---|
| 4,323,241 | A | * | 4/1982 | Deutsch ................. A63F 7/027 273/DIG. 26 |
| 4,448,417 | A | * | 5/1984 | Clark .................... A63F 9/0291 273/121 A |
| 5,316,303 | A | * | 5/1994 | Trudeau .................. A63F 7/027 273/121 A |
| 5,338,031 | A | | 8/1994 | Patla, Sr. et al. |
| 6,000,697 | A | * | 12/1999 | Popadiuk ................ A63F 7/027 273/118 A |
| 6,158,737 | A | | 12/2000 | Cornell et al. |
| 6,279,904 | B1 | * | 8/2001 | Huang .................... A63F 7/027 273/121 A |
| 6,390,470 | B1 | * | 5/2002 | Huang ..................... A63F 1/00 273/121 A |
| 2001/0030392 | A1 | * | 10/2001 | Huang ..................... A63F 1/00 273/121 A |
| 2007/0026918 | A1 | | 2/2007 | Sheats, Jr. |

(Continued)

FOREIGN PATENT DOCUMENTS

| | | | | |
|---|---|---|---|---|
| CA | 2275517 A1 | * | 12/1999 | ............. A63F 7/027 |
| WO | WO-9959686 A1 | * | 11/1999 | ............. A63F 7/027 |
| WO | WO-0041780 A1 | * | 7/2000 | ............. A63F 7/027 |

*Primary Examiner* — Raleigh W Chiu
(74) *Attorney, Agent, or Firm* — Greenberg Traurig, LLP

(57) ABSTRACT

An amusement device includes an interactive target and projector feature. The device has a cabinet housing a plurality of game input devices and game output devices and a playfield housed within the cabinet. The playfield has a top surface and a lower surface, and the upper surface is configured to allow movement of a ball, such as a pinball thereupon. A projector is operably mounted to the top surface of the playfield and the projector is configured to project an image upon a projection surface of at least one of the game input devices or game output devices located above the top surface.

11 Claims, 7 Drawing Sheets

(56) References Cited

U.S. PATENT DOCUMENTS

2013/0300058 A1* 11/2013 Stellenberg ......... G07F 17/3216
　　　　　　　　　　　　　　　　　　　　　273/121 A
2017/0001100 A1* 1/2017 Stellenberg ........... G07F 17/323

* cited by examiner

AMUSEMENT DEVICE WITH AN INTERACTIVE TARGET AND PROJECTOR FEATURE

CROSS REFERENCE TO RELATED APPLICATION

This application is a non-provisional application claiming priority from U.S. Provisional Application Ser. No. 63/044,170, filed Jun. 25, 2020, and incorporated herein by reference in its entirety.

FIELD OF THE DISCLOSURE

The present description relates generally to an amusement device, such as a pinball machine, and more particularly an amusement device with interactive target and projector feature.

BACKGROUND OF RELATED ART

Amusement game devices, such as pinball machines, redemption games, etc. of the commercial, e.g., revenue generating, and non-commercial, e.g., home entertainment, type are well known in the art. By way of example, U.S. Pat. Nos. 5,338,031, 6,158,737, and U.S. Published Application No. 2007/0026918 illustrate and describe amusement game devices of the type having a cabinet which houses a playfield.

U.S. Pat. No. 4,323,241 describes a pinball game apparatus having a movable target above a playfield, which when hit, actuates a switch that turns on film projector under the playfield. The film projector projects an image onto a matte pane screen located in the playing surface. A stepper motor is provided to control the projector so that each time the movable target is struck, a new image is projected upon the matte pane screen.

While the above-referenced patents and applications may be suitable for their intended purposes, there is an identifiable need for improvement thereto.

BRIEF DESCRIPTION OF THE DRAWINGS

For a better understanding of the target and projector disclosed hereinafter reference may be had to the following drawings.

DETAILED DESCRIPTION

The following description of example methods and apparatus is not intended to limit the scope of the description to the precise form or forms detailed herein. Instead the following description is intended to be illustrative so that others may follow its teachings.

Referring now to the figures, an example amusement device, such as a pinball machine having a playfield layout, is illustrated. In this example, the pinball machine includes an interactive targets projector feature for projecting playfield changes across the playfield and onto various targets, and in some instances, to project customized information of the targets, including gameplay scenes target images, target values, or other suitable information. Further, in one example, the target screen is transformable into a ramp for additional projection capabilities and/or different gameplay features.

With reference to the figures, an amusement game device, in the example form of a pinball machine 10 is now described. It is to be appreciated, however, that this example form for the amusement game device is not intended to be limiting. Rather, those of ordinary skill in the art will appreciated that the example projector and target assembly disclosed hereinafter can be utilized in any type of amusement game device of the commercial and non-commercial type in which it is desired to create a projection system as disclosed.

Figure 1:
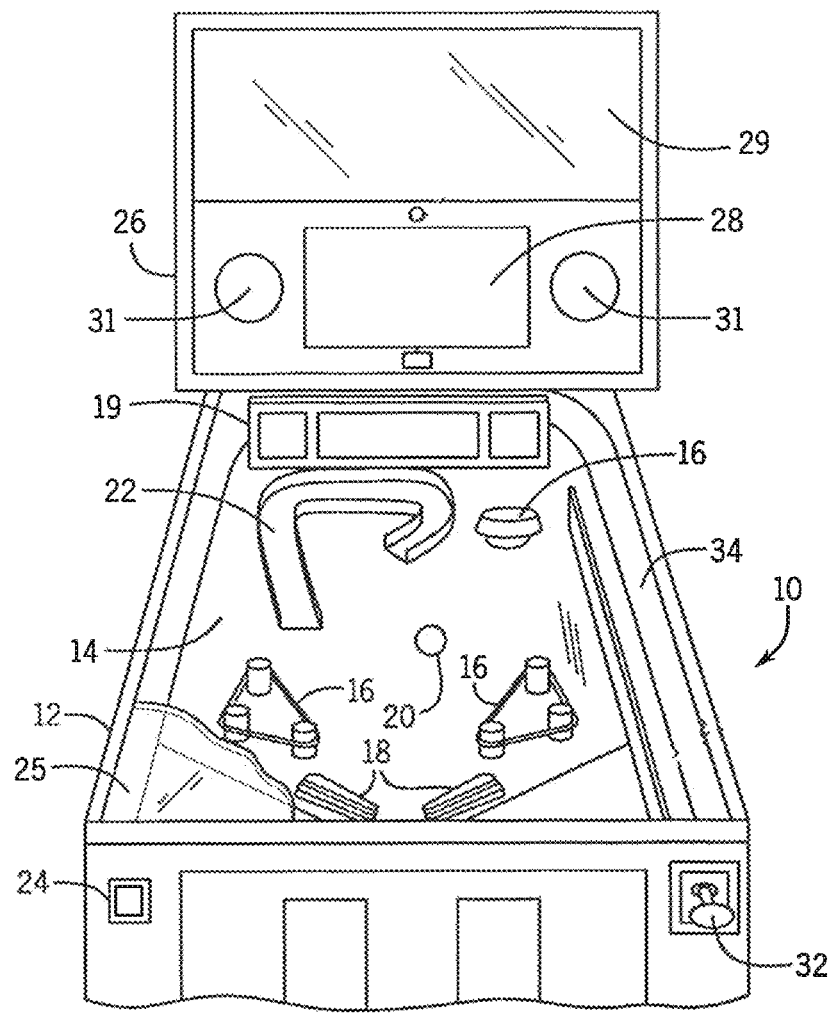
FIG. 1 illustrates an example amusement game device in the form of a pinball machine including an example of the disclosed target and projector.

The example pinball machine 10 illustrated in FIG. 1 includes a cabinet 12 which houses various apparatus used to define play of a game (e.g., "gameplay"). Gameplay may be commenced in response to insertion of money, paper or coins referred to collectively as "coins", into a coin accepting device, upon exercising of credits earned, by accepting payment from an account, e.g., via use of a swipe card reading device, a bar code reading device, a QR code reading device, a near field communications device, etc., and/or by otherwise making gameplay active, including free play. Upon activation of the game in this manner, gameplay, in the case of the example pinball machine 10, is defined upon an inclined playfield 14 that supports a number of playfield elements, accessories, and/or devices.

Figure 4:
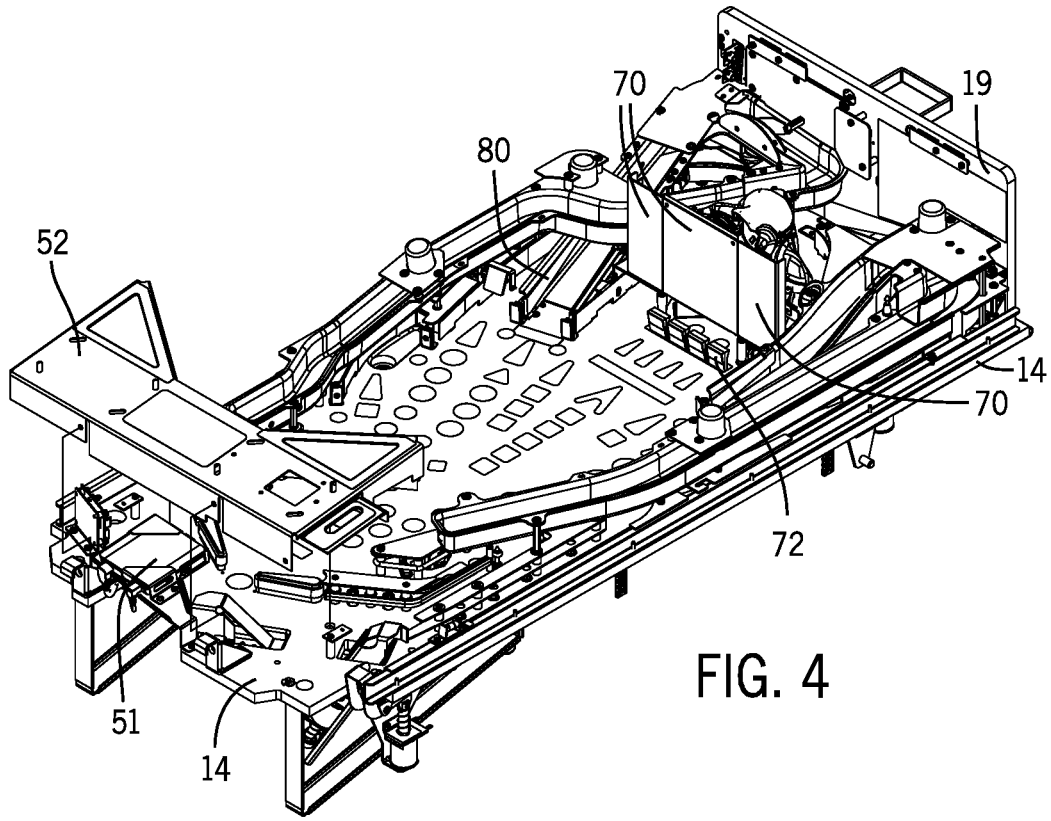
FIG. 4 is another perspective view of the example playfield of FIG. 3.
Figure 5:
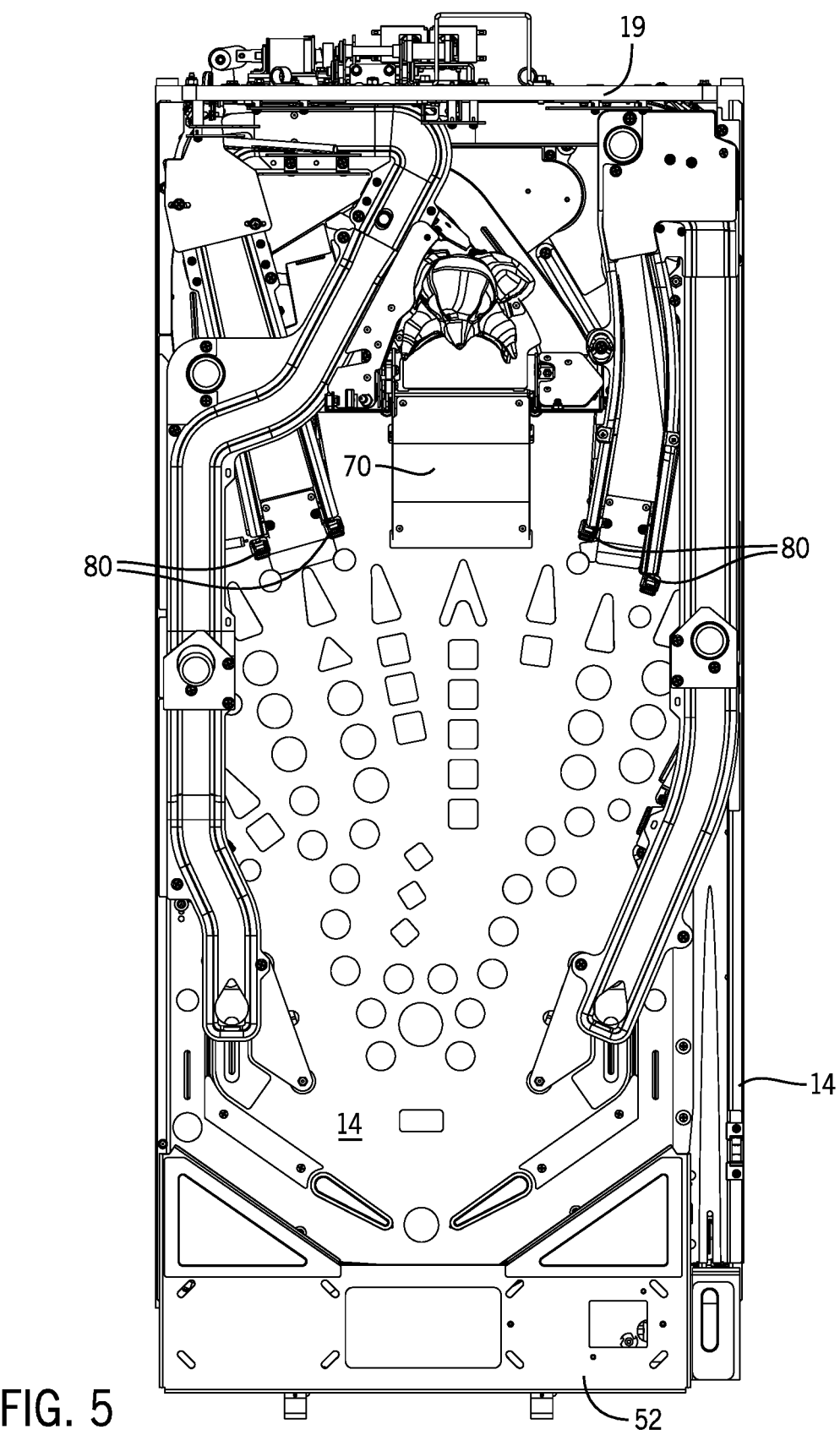
FIG. 5 is a top plan view of the example playfield of FIG. 3.

More particularly, in the case of the example pinball machine 10, gameplay is generally defined through the use of a pair of pivotable, lower flippers 18 to propel a ball 20 for movement relative to an upper side (e.g., a top surface) of the playfield 14 and input devices/accessories associated with the playfield 14. In this example the playfield 14 also includes a backpanel 19 located near an upper portion of the playfield 14 away (e.g. distally located) from the player and the lower flippers 18. In this example, the backpanel 19 stands upright (e.g., vertical) from the playfield 14. While generally described as being horizontal, the playfield 14 is usually inclined from the horizontal, such as for instance between approximately 6.5 to 7.0 degrees, such that the ball tends to eventually roll back down the playfield 14 in the direction of the lower flippers 18. While not intended to be limiting, the playfield accessories or input devices may include elements such as bumpers 16, targets (e.g. drop bank targets, spinner targets, etc.) which will be described in greater detail hereinafter. With the present disclosure, the targets, ramps, information screens, etc., may be customized and/or otherwise changed (i.e., value, display, etc.) by a projector 50 (see FIG. 4) as will be described.

The playfield 14 may be covered by a transparent or glass sheet cover 25 to permit viewing of the playfield 14. In addition to the foregoing, the playfield 14 typically includes a plunger element 32 which shoots or launches the ball 20 up an alley 34 onto the playfield 14. The playfield 14 may also include lighting elements—which may also be included as a part of the any of the input devices/accessories—and/or other features as desired. Other player-activated input elements, typically in the form of push-buttons (not shown) on the sides (or other location) of the cabinet 12, are usually provided for controlling operation of the lower flippers 18 or otherwise interacting with gameplay. The pinball machine 10 may also include a backbox 26 which is mounted to overlay a top rear portion of the cabinet 12 and which in this example contains artwork 29, and a display 28, such as a dot matrix display, CRT, LED or plasma display, or the like. The backbox 26 may also support speakers 31 associated with the game sound system. Within the backbox 26 may be located various ones of the electronic devices/circuits for controlling the operation of the playfield 14, the display 28, general illumination, and the sound system, including the speakers 31 and any additional sound system components. Such electronic devices/circuits could also, in whole or in part, be carried within the cabinet 12, or may be external to the game cabinet and linked to the pinball machine 10 via any suitable wired or wireless configuration.

Figure 2:
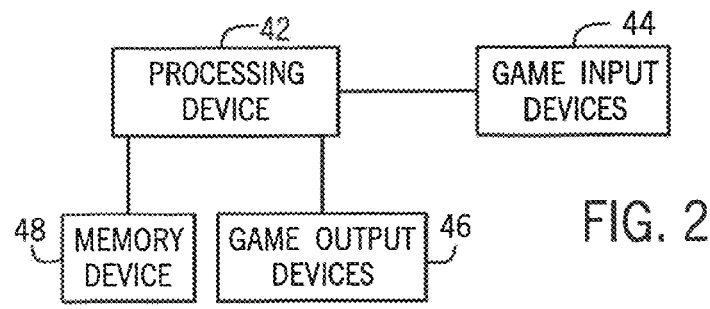
FIG. 2 is an example block diagram of example components of the amusement game device of FIG. 1.
Figure 3:
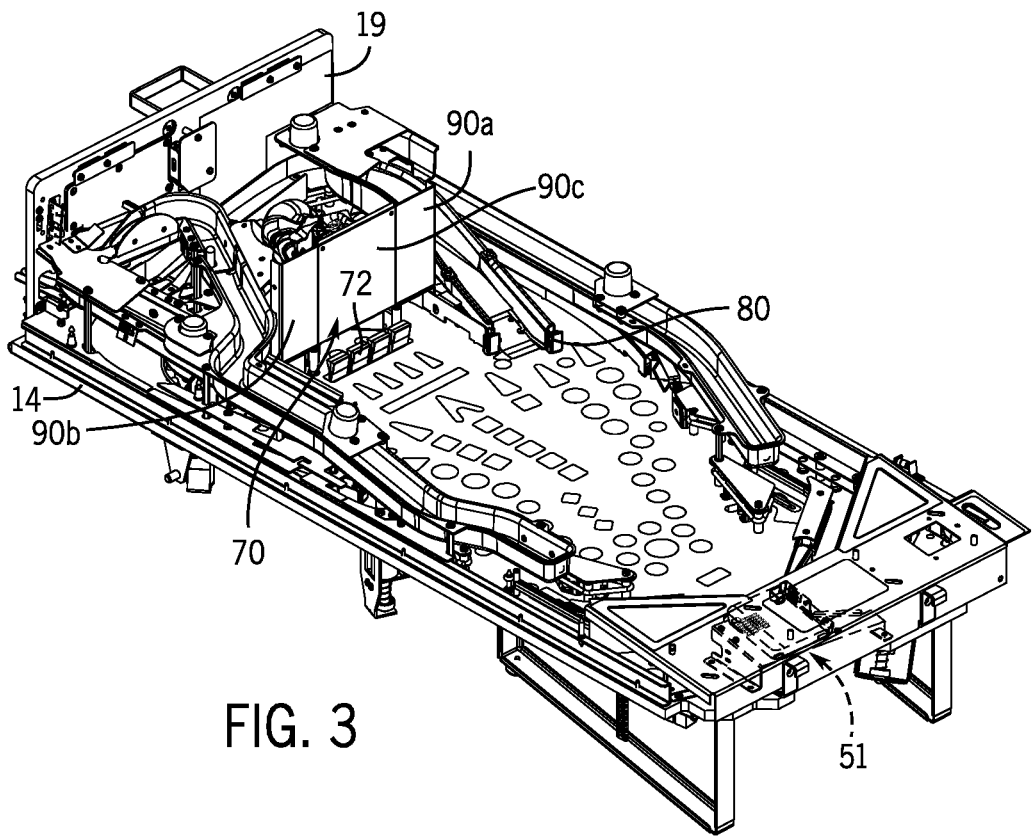
FIG. 3 is a perspective view of an example pinball playfield, including a plurality of targets, including a target ramp, and a projector gameplay feature.

Referring to FIG. 2, for controlling the various devices that form the amusement game, the example pinball machine 10 is provided with a processing device 42 which processing device 42 is, in turn, coupled to game input devices 44, such as switches associated with the cabinet 12 or the playfield 14, and game output devices 46, such as lights (including lights associated with the playfield), the bumpers 16, the lower flippers 18, the targets, the display 28, the projector 50, etc. via one or more bus systems. A memory device 48, such as a RAM, ROM, or the like, stores instructions and data usable by the processing device 42 to control gameplay, the game output devices 46, and the game input devices 44 as necessary based upon signals provided by the game input devices 44. It is to be understood that this illustrated embodiment is not intended to be limiting and that other manners for arranging the devices illustrated in FIG. 2 to provide for control of play of the amusement game can be utilized as needed.

More precisely, the example pinball machine 10 includes a projector assembly 51 located above the playfield 14 proximate to the lower end of the playfield 14. In this example, the projector assembly 51 is located below a playfield arch 52 to hide the projector assembly 51, to provide a stable mounting surface, and/or to provide additional protection.

Figure 6:
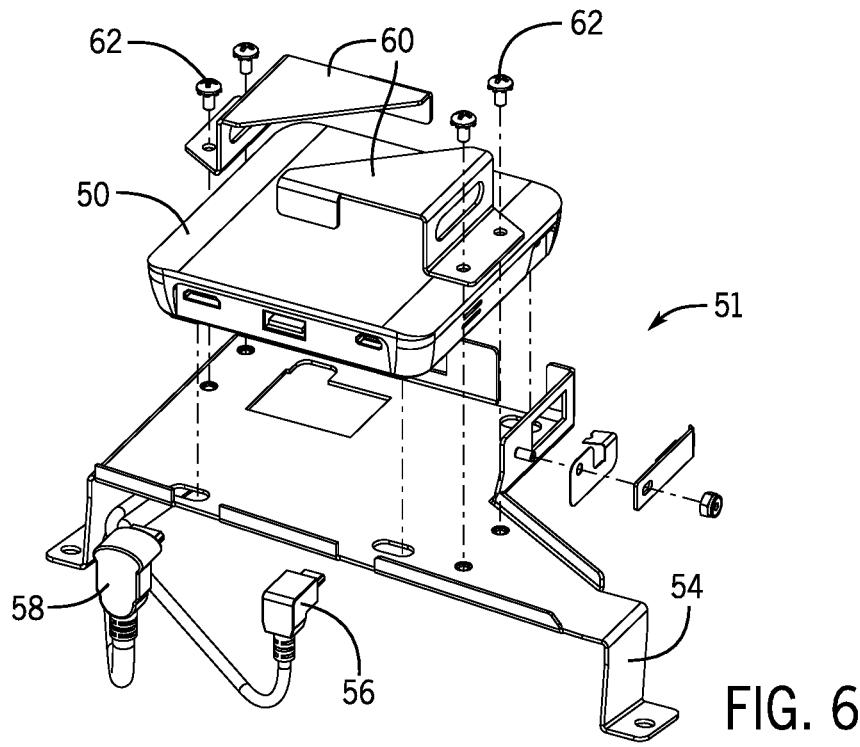
FIG. 6 is an exploded assembly view of an example projector for use in the example playfield of FIG. 3.

Referring to FIG. 6, the example projector assembly 51 comprises the projector 50 supported by a mounting bracket 54 attached, in this example, to the playfield 14 under the playfield arch 52. In this example, the projector 50 is a Nanning Wintop Model S6000 available from Nanning Wintop International Trading Co., Ltd., China. It will be appreciated that any suitable projector may be utilized as desired. The projector 50 is provided with power and/or a video signal via cable 56 and cable 58 as desired. Finally, in the illustrated example, the projector 50 is secured to the mounting bracket 54 via a bracket 60 and fasteners 64. It will be appreciated that the focus of the projector and/or the direction of the projector may be modified electronically and/or physically as needed.

Coupled to the playfield 14 and located above the surface of the playfield 14 are a plurality of discrete projection surfaces. For instance, in this configuration, the projector 50 projects visual images on a ramp and screen assembly 70, a bank drop target assembly 72, a first ramp 74, a second ramp 76. A third ramp 78, and any other suitable surface, including leaf spring targets 80, each of which will be disclosed in further detail below.

More precisely, the projector 50 can be used to project static or animated images on the ramps, targets, or other suitable playfield surfaces (or surfaces outside of the playfield) to convey visual information to the player and transform the theme of game modes and events. For instance, the projector 50 may be used to project images including transforming a feature (change of a spell out on a target bank), theming of targets and surfaces, play instructions ("shoot here") or highlighting of a particular segment of the architecture. In this manner, a physical target that provides one game feature at one point during gameplay, may be thematically changed via the projector such that the visual information is changed and the game feature of the target is also changed.

It will be appreciated that the projector 50 may include various, targeted images in a single projection (i.e., the images are specifically directed towards various, individual targets), or may include separate images as needed. In addition, the projector assembly 51 may include multiple projectors a desired. Finally, due to the location of the projector assembly 51 and the fact that the alignment of the projection surfaces may not be perpendicular to the projector surface, then images may be distorted and/or geometrically manipulated to ensure they are properly sized and properly focused on the projection surfaces.

In still other examples, a motorized articulated mounting bracket 54 for the projector 50 may be utilized such that additional surfaces inside or outside of the pinball machine 10 can be included in the theming of the play environment; such as projecting game mode specific elements on the ceiling or external parts of the cabinet to extend the game experience.

The projector 50 may also include various colors or light frequencies, such as for instance an ultraviolet light (UV light) frequency, in addition to, or in combination with the projector 50, to further interact with game features, such as playfield art that is created using UV sensitive inks that remain invisible until UV light (such as a UV LED) illuminates, thus revealing the hidden UV art.

Figure 7A:
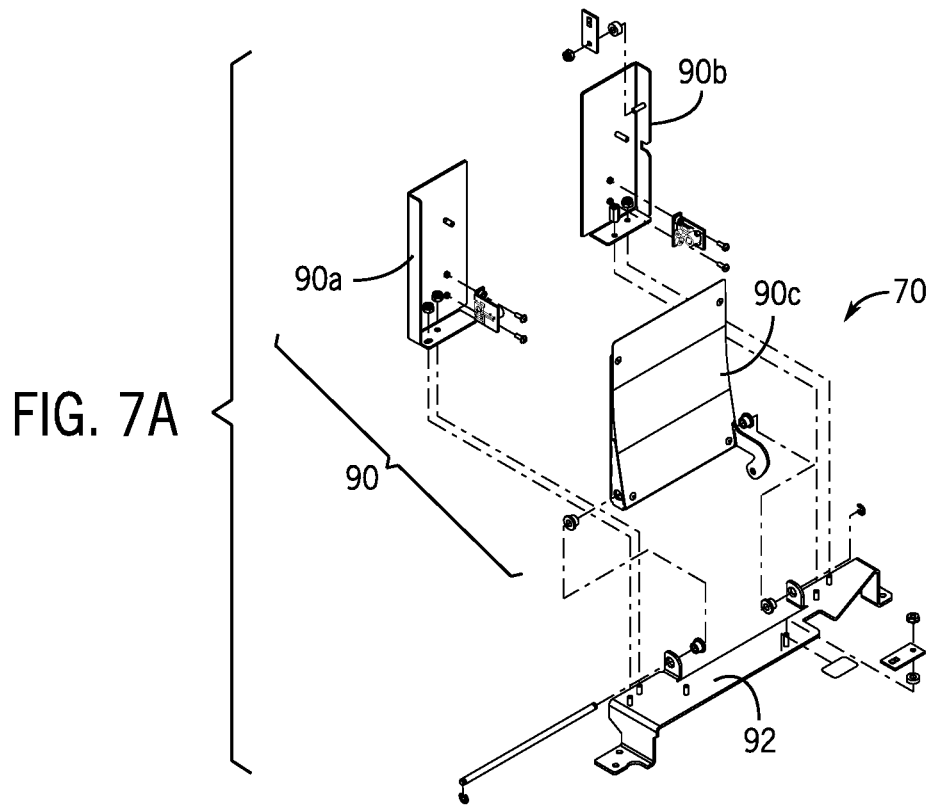
FIG. 7A is an exploded assembly view of an example target ramp for use in the example playfield of FIG. 3.
Figure 7B:
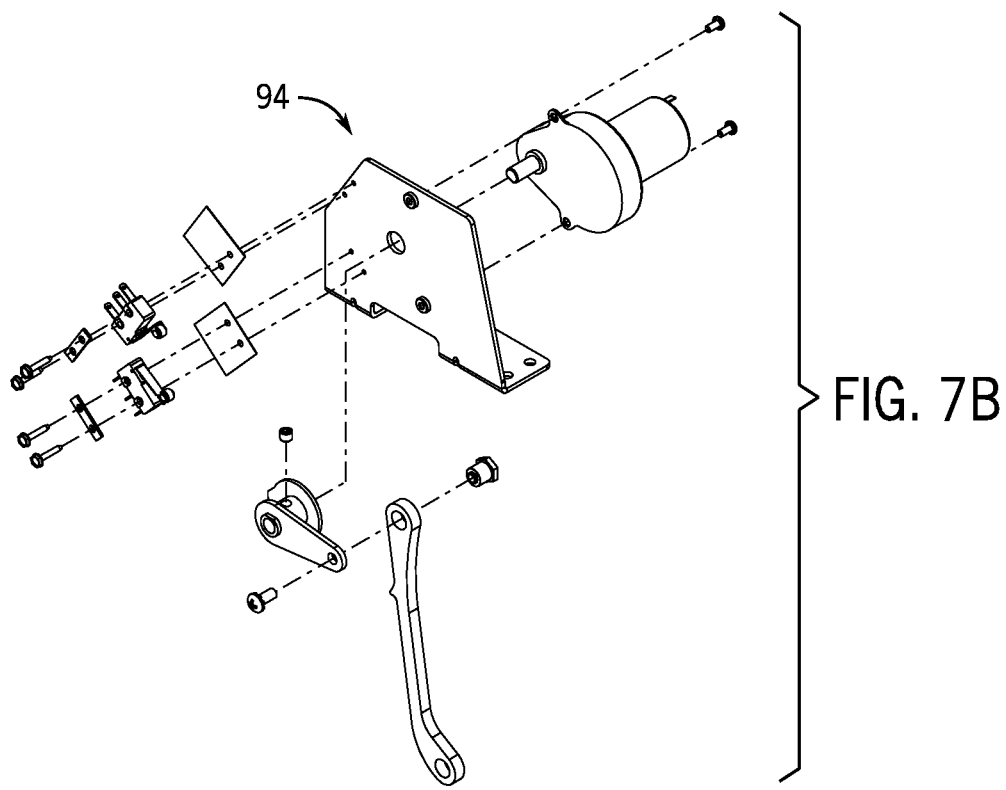
FIG. 7B is an exploded assembly view of an example actuator for movement of the example target ramp of FIG. 7A.

Referring now to FIGS. 7A and 7B, the ramp and screen assembly 70 comprises a projection screen 90, which in this example includes a first non-movable screen 90a, a second non-movable screen 90b, and a movable screen 90c. As illustrated, the movable screen 90c is disposed between the first non-movable screen 90a and the second non-movable screen 90b (i.e., the first non-movable screen 90a and the second non-movable screen 90b are laterally located from the movable screen 90c), although other arrangements may be utilized. The movable screen 90c is pivotally attached to a mount 92, which is, in turn, mountable to the playfield 14. The movable screen 90c is movable between a first configuration, where the movable screen 90c aligns with the first non-movable screen 90a and the second non-movable screen 90b to form the projection screen 90 and a second configuration, where the movable screen 90c is pivoted with a first end in contact with the playfield 14 or in close proximity to the playfield 14 and a second end elevated from the playfield 14 to allow the movable screen 90c to become a ramp to transport the ball 20. As viewed in the illustrations, in the first configuration, the projection screen 90 is generally vertical relative to the playfield 14 while in the second configuration, the first non-movable screen 90a and the second non-movable screen 90b remain generally vertical while the movable screen 90c pivots towards the surface of the playfield 14. In this instance, the movable ramp doubles as a projection surface and reveals or covers a game target. To move the movable screen 90c between the first configuration and the second configuration, an actuator 94 may be operably coupled to the movable screen 90c.

In operation, in a first gameplay mode, the projection screen 90 may be utilized to project images as noted above. As a further gameplay or feature is activated, the processing device 42 may cause the actuator 94 to move the movable screen 90c to the second configuration (i.e., a ramp) or any other desired configuration, and also cause a different projection to be projected onto any of the first non-movable screen 90a, the second non-movable screen 90b or the movable screen 90c.

For example, in one method of operation of the pinball machine 10, the processing device 42 may operate in a first gameplay mode wherein a first set of rules, including various target values and projections may be used. During gameplay, when the ball 20 impacts or otherwise interacts with various gameplay elements, the processing device 42 may initiate a second gameplay mode wherein a second set of rules, including different target values and projections, and also different physical transformations of various target elements may be used.

Figure 8:
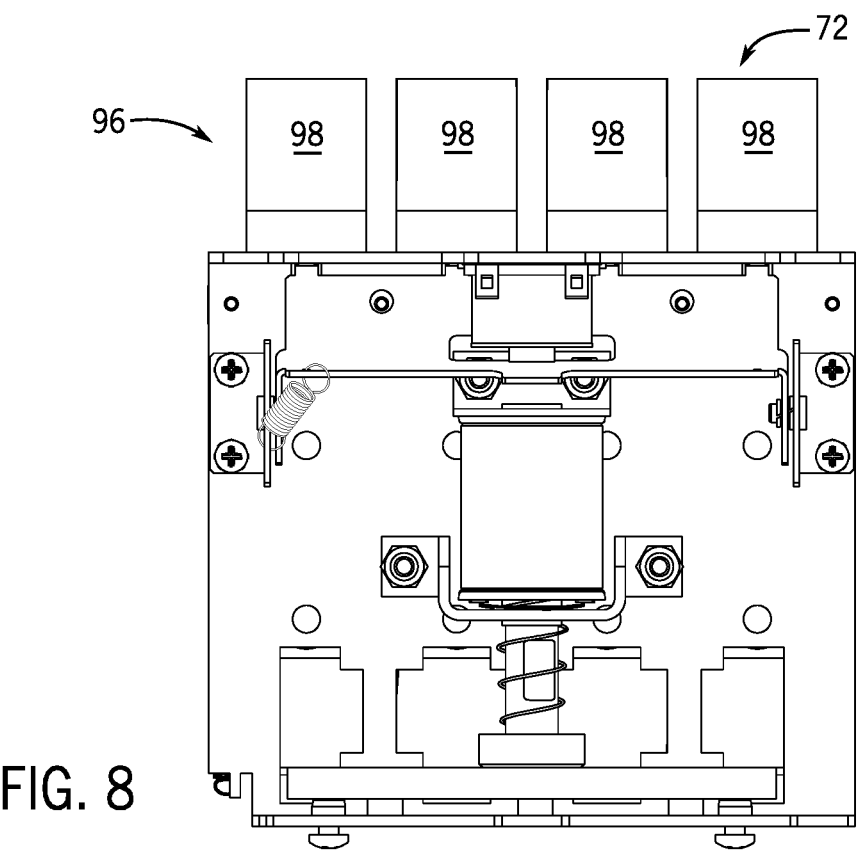
FIG. 8 is a front plan view of an example drop target assembly for use in the example playfield of FIG. 3.

Referring now to FIGS. 8-11, various other projection surfaces are illustrated in conjunction with other gameplay features. FIG. 8 illustrates the bank drop target assembly 72, which as is known in the art includes a plurality of individual targets 96 each of which includes a target face 98. In this example, the bank drop target assembly 72 is located proximate the projection screen 90 and arranged such that the projector 50 may project an image on each of the target face 98 individually As noted, in a first game mode, various images may be projected on each target face 98, while in a second game mode, other images may be projected on each target face 98.

Figure 9:
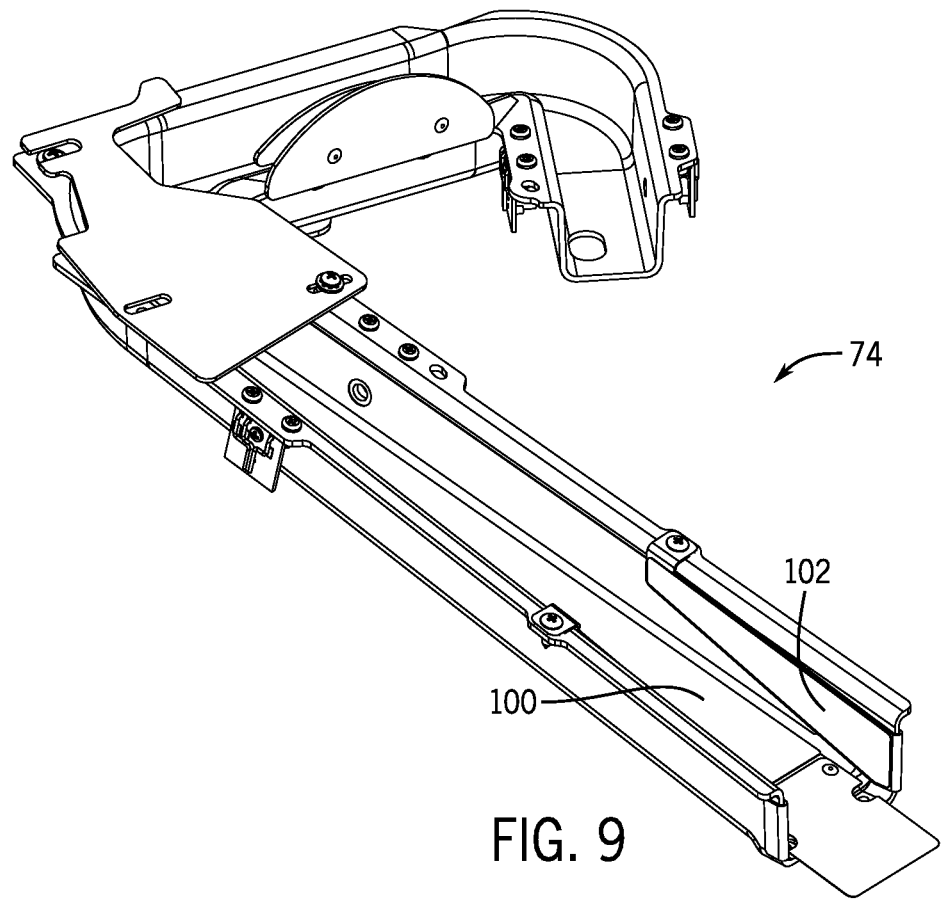
FIG. 9 is an example ramp for use in the example playfield of FIG. 3.
Figure 10:
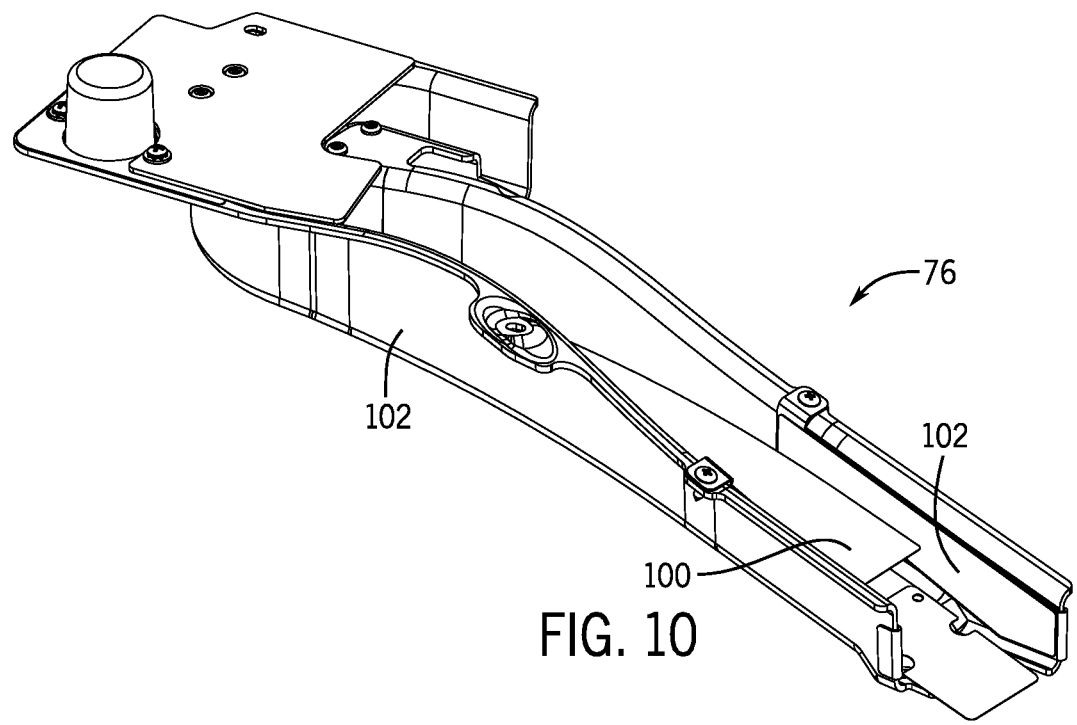
FIG. 10 is an example ramp for use in the example playfield of FIG. 3.
Figure 11:
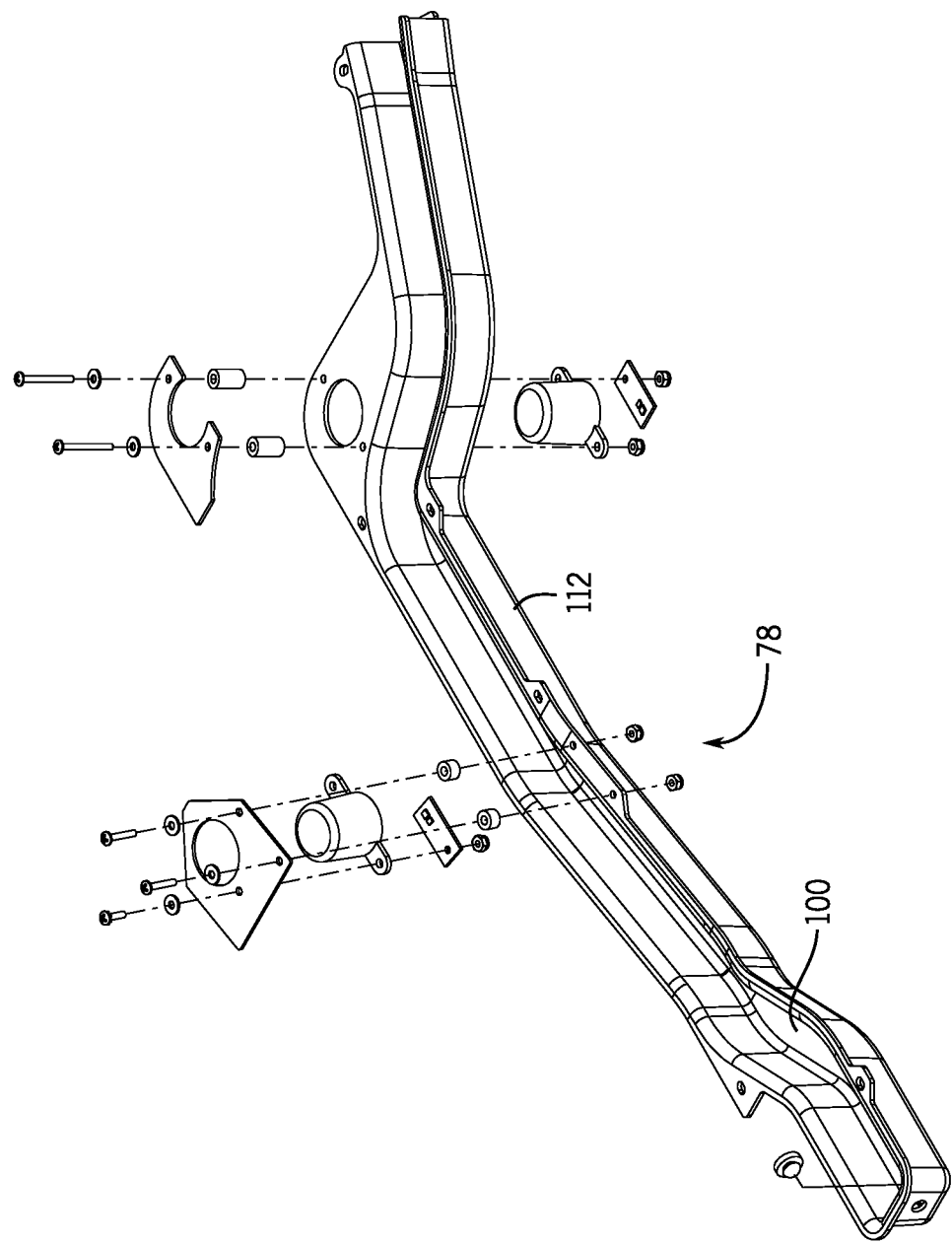
FIG. 11 is an example ramp for use in the example playfield of FIG. 3.

FIGS. 9-11 illustrate an example of the first ramp 74, second ramp 76, and third ramp 78. Each of the ramps includes a plurality of surfaces, any one of which is utilized as a projection surface in the present disclosure. For instance, each ramp may include a base ramp surface 100 and a side wall surface 102 (either an inside surface or an outside surface), any one of which may be used as a projection surface.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An amusement device with interactive target and projector feature comprising:
    a cabinet housing a plurality of game input devices and game output devices;
    a playfield housed within the cabinet, the playfield having a top surface and a lower surface, wherein the top surface is configured to allow movement of a ball thereupon; and
    a projector operably mounted to the top surface of the playfield, the projector configured to project an image upon a projection surface of at least one of the game input devices or game output devices located above the top surface, and
    wherein the game input devices comprise a projection screen assembly, the projection screen assembly comprising a mount coupled to the top surface of the playfield, the mount supporting a movable projection screen comprising the projection surface, and an actuator operably coupled to the movable projection screen, the actuator configured to move the movable projection screen between a generally vertical configuration relative to the playfield and an inclined configuration wherein a first end of the movable projection screen is proximate the playfield and a second end, opposite the first end is elevated from the playfield.

2. The amusement device of claim 1, wherein the amusement device is a pinball machine.

3. The amusement device of claim 2, wherein the game input devices comprise a target assembly having the projection surface integrally formed therewith, and the projector projects an image upon the projection surface.

4. The amusement device of claim 3, wherein a first ball interaction with the target assembly provides a first game outcome when the amusement device is in a first game mode and wherein a second ball interaction with the target assembly provides a second game outcome when the amusement device is in a second game mode,
    wherein in the first game mode, the projector projects a first image upon the projection surface, and
    wherein in the second game mode, the projector projects a second image upon the projection surface, the second image being different than the first image.

5. The amusement device of claim 2, wherein the projector is supported by a projector mount coupled to the top surface of the playfield.

6. The amusement device of claim 5, wherein the projector mount comprises an adjustment mechanism to vary a position of the projector relative to the top surface.

7. The amusement device of claim 2, wherein the projector is configured to project a plurality of discrete images upon a plurality of discrete projection surfaces.

8. The amusement device of claim 2, wherein the projection surface is not perpendicular relative to the projector and wherein the projector is configured to project a geometrically manipulated image upon the projection surface.

9. The amusement device of claim 1, where the projection screen assembly further comprises a non-movable screen laterally located from the movable projection screen.

10. A pinball machine comprising:
    a cabinet housing a plurality of game input devices and game output devices;
    a processing device coupled to the plurality of game input devices and game output devices, wherein the processing device is configured to monitor interaction of a ball with the plurality of game input devices and game output devices to conduct a gameplay in first game mode and a second game mode;
    a playfield housed within the cabinet, the playfield having a top surface and a lower surface, wherein the top surface is configured to allow movement of the ball thereupon to interact with the plurality of game input devices and game output devices; and
    a projector operably mounted to the top surface of the playfield, the projector configured to project an image upon a projection surface of at least one of the game input devices or game output devices located above the top surface, wherein a first ball interaction with the plurality of game input devices and game output devices provides a first game outcome when the processing device is in the first game mode and wherein a second ball interaction with the plurality of game input devices and game output devices provides a second game outcome when the pinball machine is in the second game mode, wherein in the first game mode, the projector projects a first image upon the projection surface, and wherein in the second game mode, the projector projects a second image upon the projection surface, the second image being different than the first image, and wherein the plurality of game input devices and game output devices comprises a projection screen assembly, the projection screen assembly comprising a mount coupled to the top surface of the playfield, the mount supporting a movable projection screen comprising the projection surface, and an actuator operably coupled to the movable projection screen, the actuator configured to move the movable projection screen between a generally vertical configuration relative to the playfield and an inclined configuration wherein a first end of the movable projection screen is proximate the playfield and a second end, opposite the first end is elevated from the playfield.

11. The pinball machine of claim 10, wherein the projection surface is not perpendicular relative to the projector and wherein the projector is configured to project a geometrically manipulated image upon the projection surface.

* * * * *